Figure 1:
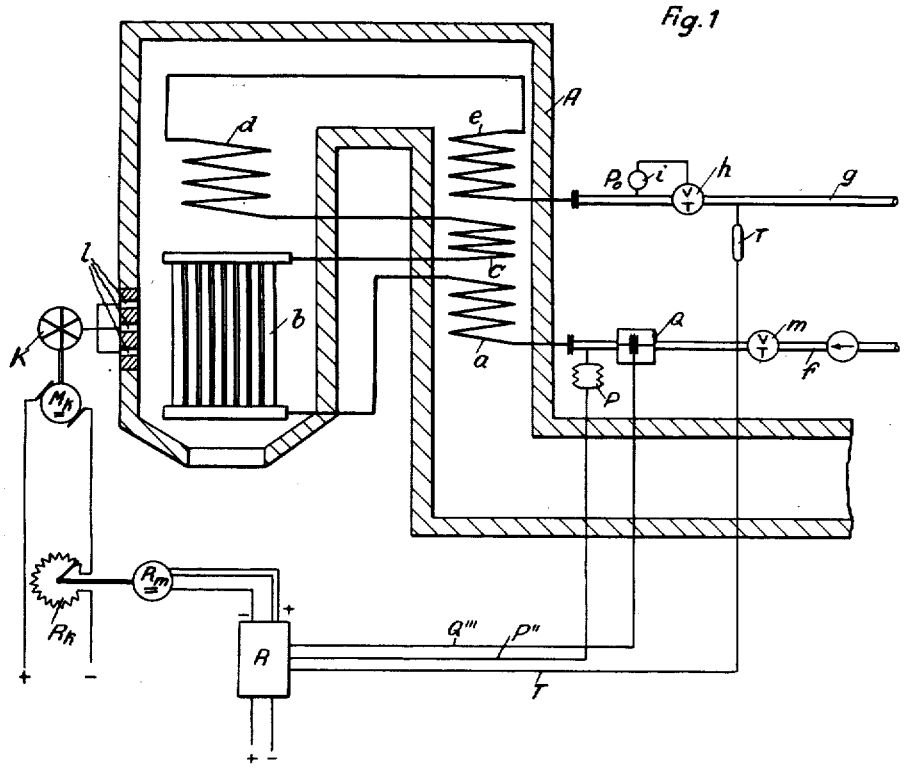

Inventor
Bernd Zuppke

Inventor
Bernd Zuppke

United States Patent Office 2,811,311
Patented Oct. 29, 1957

2,811,311

METHOD OF GOVERNING A STEAM GENERATOR AND GOVERNING SYSTEM THEREFOR

Bernd Zuppke, Berlin, Germany

Application September 23, 1955, Serial No. 536,120

16 Claims. (Cl. 236—20)

My invention relates to a steam generator having a heating zone equipped with fuel burners, a duct extending through the heating zone, and a pump or other means for continuously forcing a stream of liquid through the duct to transform the liquid into steam, and, more particularly, to a method and system for governing the fuel supply so as to keep the quantity of steam generated at the required norm.

The steam generator must be so governed that the fuel quantity supplied and the quantity of liquid fed to the steam generator are permanently maintained at such a ratio that the end temperature of the steam will remain substantially constant. Experience has shown that it is more difficult to comply with that requirement than to adapt the quantity of the liquid medium to the load imposed at any time. The difficulty is enhanced by the fact that the heat supply is subject to undesirable but unavoidable fluctuations caused, for instance, by changes of the humidity of the fuel, changes of the character of the fuel, inaccuracies in the control of the supply of the fuel to the burners etc., such fluctuations of the heat supply causing changes of the steam temperature.

It is the object of my invention to provide a method and a system for so governing the fuel supply of the steam generator that conditions tending to disturb the balance between the supply of water and the supply of heat are compensated for, no matter whether such conditions are desired or undesired, such compensation being effected instantaneously so that large fluctuations cannot occur. Experience has shown that this object is extremely difficult to attain because the unbalance affects the temperature not immediately, but after a larger or smaller delay, depending on the time required for the medium to be vaporized and for passing through the steam generator. Also the governing action produced on the basis of an unbalance has no immediate effect, but becomes effective after a considerable delay. Therefore, as a rule, the governing impulse derived from the deviation of the temperature cannot preclude comparatively large fluctuations. The delay occurring between the unbalance and the effect produced by the governing function may be reduced by providing a heated measuring duct in the steam generator, the so-called secondary heating surface creating, so to speak, a picture of the temperature of the entire generator. In the secondary heating surface the disturbances will have a more rapid effect and, therefore, may be more rapidly counteracted by deriving the governing impulse from this secondary heating surface. But even such governing means permit the reduction of temperature fluctuations to a limited degree only.

My invention is based on a phenomenon which I have discovered, such phenomenon being the dependence of the pressure on the disturbed balance between the heat supply and the quantity of the liquid medium to be vaporized. I have found that such disturbance results with a negligible delay in a perceptible pressure variation. As an illustration let us assume, for instance, that with a given steam pressure produced by the generator the heat liberated in the combustion chamber is reduced, because pulverized coal having a lesser caloric value is fed to the burners. Then a reduction of pressure occurs nearly instantaneously in the upstream section of the duct, for instance near the entrance end thereof, whereas a change of temperature resulting from the variation of the fuel will occur at the exit end of the duct after a delay of several minutes only.

It is the object of my invention to provide an improved governing method and system for steam generators in which the fuel supply to the burners of the steam generator is governed in dependence on such variation of pressure, and in which any variation of pressure produced by a disturbance of the balance of fuel feed and feed of the liquid to be vaporized serves the purpose of producing a governing impulse controlling the fuel supply so as to forestall such a change of the heat generation as would result in a change of the temperature of the steam generated.

It is another object of my invention to provide highly sensitive measuring means for detecting relatively slight variations of pressure at the entrance end of the steam generator or, more specifically, in the upstream section of the duct containing the medium to be vaporized in the liquid state, such measuring means being able, for instance, to positively and reliably detect a pressure fluctuation of about 85 p. s. i. at the entrance end of a steam generator operating at 2,150 p. s. i. More specifically, it is an object of my invention to provide such sensitive pressure measuring means which are simple of design and reliable in operation.

Further objects are to detect variations of the pressure differential existing between the entrance end and the discharge end of the steam generator by measuring a flow quantity, and to provide an improved method and system for governing the fuel supply to the burner of a continuous steam generator in dependence on variations of liquid pressure at the entrance end of the duct for the liquid to be vaporized, such method and system functioning properly under conditions where the quantity of liquid fed to the generator is varied in response to a variation of the load imposed on the steam generator.

Figure 1A:
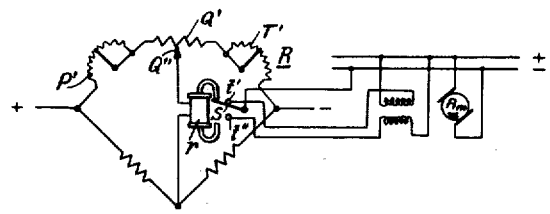
Figure 2:
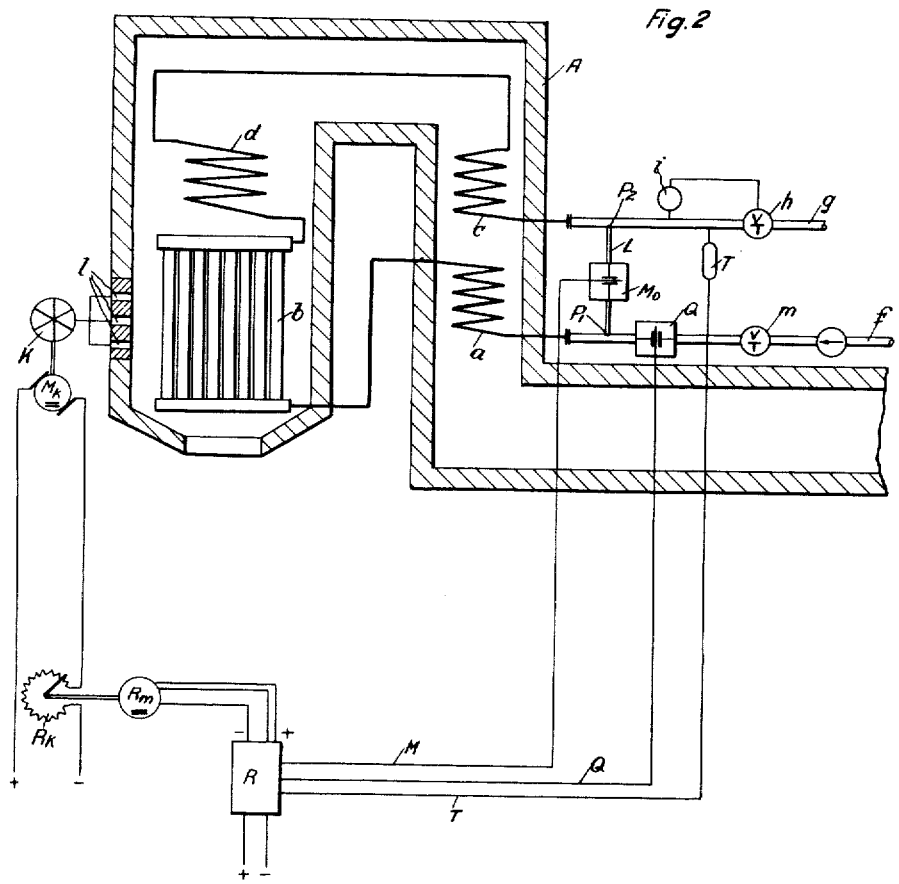
Figure 2A:
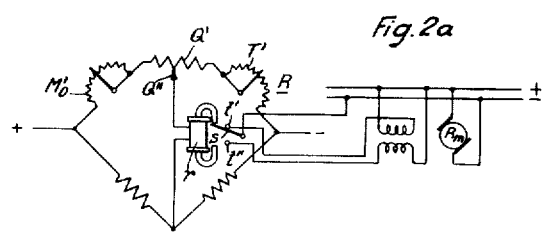

Further objects of my invention will appear from the description following hereinafter of two preferred embodiments of my invention which are diagrammatically illustrated in the accompanying drawings, in which:

Fig. 1 is a diagrammatic sectional view of a continuous steam generator equipped with my novel governing system, Fig. 1a is a circuit diagram connecting the measuring instruments with the servo-motor, the circuit shown therein being diagrammatically indicated in Fig. 1 by a rectangle, Fig. 2 is a view similar to that of Fig. 1 of a steam generator provided with a modified governing system in which the circuit connecting the measuring instruments with the servo-motor is diagrammatically indicated by a rectangle, and Fig. 2a illustrates such circuit diagrammatically.

In Fig. 1 a steam generator of the once-through type is represented in a diagrammatical manner, such generator having a heating zone equipped with fuel burners $l$, a duct extending through the heating zone, and means, such as a pump, for continuously forcing a stream of liquid, preferably water, through the duct to transform the liquid into steam. More particularly, the duct includes the pressure pipe $f$ of the feed pump, a control valve $m$ controlling the quantity of liquid to be vaporized, an economizer coil $a$ located in the flue to preheat the water by the hot combustion gases, the boiler section $b$ subjected to the heat radiated from the burners, a coil $c$ disposed in the flue above the economizer coil $a$ in which any of the medium that is still liquid is transformed into steam, the primary super heater $d$, the secondary super heater $e$, and a conduit $g$ leading to a consumer, for instance to a steam turbine of a power station. The pressure prevailing in the downstream section of the duct is kept constant by a throttle valve $h$ which is connected with and adjustable by an instrument $i$ measuring the pressure $P_0$ prevailing between the secondary super heater $e$ and the throttle valve $h$. A suitable fuel, such as pulverized coal, is supplied to the burners $l$ by a rotary metering device $K$, the speed of rotation of which is controlled by my novel governing system. For this purpose, the metering device $K$ is connected for rotation with a variable speed motor $M_K$, the speed of which is determined by adjustment of suitable control means $R_K$ represented for the sake of simplicity as a variable resistance adapted to be adjusted by a reversible servo-motor $R_M$, the direction of rotation of which is controlled by the governing unit $R$ shown in Fig. 1 as a rectangle.

When the motor $R_M$ is put in operation it will vary the adjustment of the control means $R_K$ thereby reducing or increasing the speed of rotation of the motor $M_K$ and of the fuel meter $K$ connected thereto. For the purpose of the present invention variations of pressure prevailing in the liquid section of the stream of the medium to be vaporized are measured near the entrance of the stream into the heating zone. For this purpose, a pressure gauge $P$ is connected to the duct at a point located outside of the furnace between the valve $m$ and the economizer coil $a$. In a manner to be described hereinafter the pressure gauge is connected with the governing unit $R$ and adapted to so adjust the same that, when in the duct an increase of pressure is detected, the fuel metering device $K$ is slowed down to reduce the quantity of fuel supplied to the burners $l$, but when a drop of pressure in the duct is detected, the metering device $K$ is sped up to increase the heat produced.

The governing unit $R$ may be formed by a Wheatstone bridge shown in Fig. 1$a$, such bridge including a variable resistance $P'$, the arm of which is connected with the pressure gauge $P$ by mechanical means diagrammatically indicated in Fig. 1 by the line $P''$. The diagonal conductor of the bridge includes the coil of a polarized relay $r$. The armature $s$ of the relay is resiliently retained by a spring not shown in a centered position out of engagement with contacts $t'$ and $t''$. Depending on the polarity of the voltage applied to the relay coil, the armature $s$ is pivoted to the position shown into engagement with contact $t''$ or into the opposite position engaging contact $t'$. Depending on whether the pressure measured by the pressure gauge $P$ rises or drops, the resistance $P'$ is changed in the one sense or in the opposite sense, whereby the balance of the bridge will be disturbed causing the relay to close its contact $t'$ or its contact $t''$. The field windings of the motor $R_M$ are so connected to the contacts $t'$ and $t''$ that the motor $R_M$ will rotate in one direction when the contact $t'$ is closed and will rotate in the opposite direction when the contact $t''$ is closed. Therefore, an increase of pressure in the duct causes motor $R_M$ to reduce the speed of the metering device $K$ thus reducing the quantity of fuel supplied to the burners, and when a reduction of pressure is detected by the pressure gauge $P$, the motor $R_M$ is started in the opposite direction causing the quantity of fuel supplied to the burners to be increased.

Thus, it will appear that a change of pressure prevailing in the liquid section of the stream near the entrance into the heating zone, such as is caused by a disturbance of the balance between the quantity of liquid flowing in the stream and the quantity of fuel supplied, serves the purpose of producing a governing impulse varying the fuel supply even before the unbalance has resulted in a change of the steam temperature.

When the output of the steam generator is changed, being increased for instance, an increased quantity of liquid is fed to the pipe $f$ whereby the pressure measured by the pressure gauge $P$ is increased. In the absence of the means described hereinafter, such increase of pressure will result in a reduction of the fuel supply. Such reduction, however, would not be permissible. In order to vary the adjustment of the governing unit $R$ in conformity with the increased liquid supply, a flowmeter $Q$ is installed in the pipe $f$, such flowmeter serving to adjust the governing unit $R$ in conformity with the increased output. The flowmeter measures the volume of liquid fed to the steam generator per time unit and is mechanically connected by suitable means $Q'''$, such as a shaft, with the arm $Q''$ of a potentiometer $Q'$ inserted in the Wheatstone bridge, the arm $Q''$ assuming its central position when the generator has a medium output and moving to the right or to the left when the output is increased or reduced. This has the effect of compensating for any adjustment of the variable resistance $P'$ effected by the pressure gauge $P$ in response to an increase or reduction of the water feed. Therefore, the pressure gauge $P$ will not cause any operation of the relay $r$ unless the pressure in the duct differs from its new norm indicated by arm $Q''$, irrespective of whether such difference is caused by a deviation of the feed water quantity from its new norm or by a deviation of the fuel quantity from its norm.

In view of the various factors influencing the steam temperature, such as the deposition of foreign matter on the heated surface of the duct, it is advisable to regulate the end temperature of the steam generated. For this purpose, a thermostat $T$ is provided which is coordinated to the pipe $g$ and controls the movable arm of a variable resistance $T'$ inserted in the Wheatstone bridge. When the temperature of the steam generated surpasses a certain limit, the variable resistance $T'$ is so altered that the governing unit $R$ causes the servo-motor $R_M$ to keep the fuel quantity smaller. When the temperature of the steam drops below said limit the opposite effect will take place.

From the foregoing it will appear that the pressure measuring means $P$ associated with the duct near the entrance thereof into the heating zone will detect such variations of pressure as are caused by variations of the ratio between the quantity of liquid flowing in the duct and the quantity of heat generated in the heating zone.

It is therefore clear that the Wheatstone bridge connecting the measuring means $P$ with the governing element $R_K$ includes an adjustable element $Q'$ representative of a norm of the pressure. The arm $Q''$ is operative, through the relay coil $r$ to which it is connected, to cause adjustment of the governing element $R_K$ when the pressure measured by the pressure gauge $P$ differs from the norm. Further the system comprises the flowmeter $Q$ installed in the upstream section of the duct, and the means $Q'''$ connecting the flowmeter $Q$ to the adjustable element $Q''$ for adjustment of the latter in dependence on the quantity of steam generated.

It is a prerequisite for the accurate functioning of the particular system described with reference to Figs. 1 and 1$a$ that the pressure gauge $P$ be sufficiently sensitive to reliably detect the comparatively small variations of pressure. As stated hereinabove, the sensitivity of the gauge must be adequate, for example, to detect changes of about 85 p. s. i. if the steam generator is operated at a pressure of 2,150 p. s. i. Pressure gauges of such sensitivity, however, are rather expensive. In order to avoid the necessity of employing such an expensive measuring instrument, I have devised the system illustrated in Figs. 2 and 2$a$ in which the difference of the pressures existing at two spaced points of the duct is measured, one point being located in the liquid section of the stream, preferably near the entrance thereof into the boiler, and the other point being preferably located near the exit of the duct or in the neighborhood thereof. The difference of pressures so measured is independent of the operating pressure of the steam generator.

As shown in Fig. 2, a flowmeter $M_0$ is installed in a bypass conduit $L$ located outside of the heating zone and connecting the steam-containing downstream section at $p_2$ with the liquid-containing upstream section of the duct at $p_1$. Means diagrammatically indicated by the line M connect the flowmeter Mo with the governing unit R and, more particularly, with the arm of the variable resistance M′o shown in Fig. 2a. The other elements shown in Figs. 2 and 2a are disposed and connected in the same manner as described hereinabove with reference to Figs. 1 and 1a, it being understood that the only difference between the two embodiments is the substitution of the flowmeter Mo in Fig. 2 for the pressure gauge P in Fig. 1.

Any suitable flowmeter may be employed measuring the volume of the liquid flowing per time unit through the bypass conduit L.

The operation of the system shown in Figs. 2 and 2a differs from that shown in Fig. 1 in the following manner: Any disturbance of the balance between the quantity of liquid fed to the boiler and the heat supplied thereto results in a transient condition in which the ratio between the volume of the liquid in the duct and the volume of the steam in the duct varies until such ratio reaches a new steady value. During this transient condition the pressure drop in the steam generator, i. e. the difference of the pressures existing at $p_1$ and $p_2$, varies. This phenomenon is the basis of this aspect of the invention. Therefore, it will readily appear that the quantity of liquid passing through conduit L per time unit will change in response to any disturbance of the balance between the quantity of liquid fed to the generator and the heat supplied to the medium to be vaporized. An increase of the quantity indicated by the flowmeter Mo is indicative of an excessive heat generation, whereas a reduction of the quantity measured by the flowmeter Mo indicates insufficiency of the heat generated. Therefore, the balance between the quantity of liquid fed to the generator and the heat supplied to the liquid is maintained by suitable adjustment of the variable resistance M′o.

If desired, the flowmeter Q could be inserted in the downstream section $g$ of the duct, although I prefer the installment in the upstream section as shown in Fig. 2, as the flowmeter will quicker respond to fluctuations of the quantity of liquid fed to the generator when installed at this point.

The flowmeter Mo in Fig. 2 offers the advantage of greater sensitivity over the pressure gauge P in Fig. 1. One might object that the accuracy of the measurement appears to be impaired by the fact that the medium to be vaporized requires considerable time for flowing from the point $p_1$ to the point $p_2$. I have found, however, that this fact does not in any way reduce the accurate response of the flowmeter Mo, because any variations of pressure arising at $p_1$ are transmitted at the speed of sound amounting to about 120 meters per second in water to the point $p_2$ so that for all practical purposes variations of the pressure existing at $p_1$ occur practically at the same instant at $p_2$. This is the reason why the flowmeter Mo installed in the non-heated bypass conduit L will immediately indicate any variations of pressure caused by an unbalance between the quantity of liquid fed to the boiler and the heat supplied to the liquid. As the measuring instrument Mo need not detect a comparatively slight variation of a relatively high pressure, but detects a considerable variation of the flow as caused by the unbalance above referred to, even the slightest unbalance will be detected with great accuracy and without any delay. Clearly, it is much simpler to measure the flow quantity depending on the difference of the pressures prevailing at $p_1$ and $p_2$ than to measure variations of the absolute pressure at $p_1$ as practiced in the system shown in Fig. 1.

In order to regulate the temperature of the steam produced by a once-through generator in which the steam delivery pressure is maintained constant, it has been proposed prior to my invention to provide a thermostat measuring the steam temperature and controlling the quantity of water supplied by increasing such quantity when the temperature rises and by reducing such quantity when the temperature drops. Moreover, in this prior steam generator regulating means are provided in which the pressure in the live steam duct is compared with the pressure prevailing in the water supply section of the duct, such means being operative when the thermostat increases the water supply and, therefore, increases the pressure difference to reduce the fuel supply and vice versa. While in this system, too, the fuel supply is controlled in dependence on the difference between the pressure prevailing in the water supply section and the pressure prevailing in the live steam section of the duct, such control is effected subsequently to the change of temperature of the steam and, therefore, is apt only to correct the regulation carried out by the temperature regulator.

In my novel system, however, the fuel control depends directly on the pressure change caused by the disturbance of the balance normally existing between the quantity of the water fed to the generator and the heat supplied to the water before such disturbance can cause a change of the steam temperature. The additional temperature control effected by the thermostat T does not precede the pressure change, but is effected subsequently thereto.

My novel system performs two distinct functions. One of these functions occurs when the output of the generator or, in other words, the load imposed on the generator remains constant. In this event, any response by the instrument P in Fig. 1 or the instrument Mo in Fig. 2 is caused by a change of the heat supply. As a result, the controlling element $R_K$ is adjusted solely in dependence on the change detected by P or Mo. The other function occurs when the load imposed on the generator is changed and the quantity of the water supplied to the generator is reduced or increased accordingly. In this event, the fuel supply must be varied. When that happens it is necessary to change the norm to which the control system is adjusted by the arm Q″ of potentiometer Q′. This adjustment is derived from the quantity of the water supplied measured by the instrument Q. As a result, the quantity of the water supplied will properly balance the quantity of the fuel supplied. If this balance is disturbed the Wheatstone bridge produces a controlling impulse effective until the balance has been restored.

While the invention heas been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a process of generating steam by forcing a continuous stream of liquid water through a heating zone and by continuously supplying heat for said zone, the method of governing such process which comprises measuring such variations of pressure prevailing in the liquid section of said stream near the entrance into said heating zone as are caused by variations of the ratio between the quantity of liquid flowing in said stream and the quantity of heat generated in said zone, and increasing the heat supply as said pressure drops and reducing the heat supply as said pressure increases.

2. In a steam generator having a heating zone equipped with a fuel burner, a duct extending through said zone and means for continuously forcing a stream of liquid through the duct to transform the liquid into steam, the governing system comprising pressure sensitive means associated with said duct near the entrance thereof into said heating zone and adapted to detect variations of pressure caused by variations of the ratio between the quantity of liquid flowing in said duct and the quantity of heat generated in said zone, a governing device associated with said fuel burner and adapted to govern the heat supplying capacity thereof, and means connecting said pressure sensitive means with said governing element and adapted to adjust the latter in dependence on said variations of pressure causing said element to increase the heat supplied as said pressure drops and to reduce the heat supplied as said pressure increases.

3. In a steam geneartor having a heating zone equipped with a fuel burner, a duct extending through said zone and means for continuously forcing a stream of liquid through the duct to transform the liquid into steam, the governing system comprising a governing element associated with said fuel burner and adapted to govern the quantity of fuel supplied thereto, a bypass conduit located outside of said heating zone and connecting the steam-containing downstream section with the liquid-containing upstream section of said duct, a flowmeter in said bypass conduit, and means connecting said flowmeter with said governing element and adapted to adjust the same in dependence on the rate of flow in said bypass conduit and causing said element to increase the fuel supply as the rate of flow in said bypass conduit drops and to reduce the fuel supply as said rate increases.

4. The governing system claimed in claim 2 in which said means connecting said pressure sensitive means with said governing element includes an adjustable element representative of a norm of said pressure and adapted to cause adjustment of said governing element when said pressure differs from said norm, said system further comprising a flowmeter installed in the upstream section of said duct, and means connecting said flowmeter to said adjustable element for adjustment of the latter in dependence on the quantity of steam generated.

5. The governing system claimed in claim 2 further comprising a thermostat associated with the downstream section of said duct responsive to the temperature of the steam therein, said thermostat being connected to said means connecting said measuring means with said governing element whereby the adjustment of said governing element will be effected in dependence on both said variations of pressure and the temperature of the steam generated.

6. In a process of generating steam by forcing a continuous stream of liquid water through a heating zone and supplying heat for said zone, the method of governing such process which comprises determining the variations in pressure prevailing in the liquid stream in the intake region of the heating zone caused by variations in the ratio between the quantity flowing in said stream intake and the quantity of heat supplied to said zone, and subjecting the heat supply for said zone to partial control by such variations in pressure, said partial control being in the sense of increasing the heat supply when the said pressure drops and reducing the heat supply as said pressure increases, and preventing a pressure variation in said intake region caused by a change in output of the process, and a consequent variation in water intake, from reducing or increasing the heat supply, by determining the rate of liquid flow and subjecting the heat supply to partial control thereby in the sense of compensating for any control response due to variation in said pressure caused by increase or reduction of the water feed.

7. In a process of generating steam by forcing a continuous stream of liquid water through a heating zone and supplying heat for said zone, the method of governing such process which comprises determining the variations in pressure prevailing in the liquid stream in the intake region of the heating zone caused by variations in the ratio between the quantity of liquid flowing in said stream intake and the quantity of heat supplied to said zone, and subjecting the heat supply for said zone to partial control by such variations in pressure, said partial control being in the sense of increasing the heat supply when the said pressure drops and reducing the heat supply as said pressure increases, and preventing a pressure variation in said intake region caused by a change in output of the process, and a consequent variation in water intake, from reducing or increasing the heat supply, by determining the rate of liquid flow and subjecting the heat supply to partial control thereby in the sense of compensating for any control response due to variation in said pressure caused by increase or reduction of the water feed, and determining the temperature of the stream generated and subjecting the heat supply to partial control in correspondence therewith in the sense of increasing the heat supply when the temperature drops and decreasing it when it rises.

8. The process defined in claim 6 in which the pressure determined is the pressure differential existing between the intake region of the heating zone and the steam discharge region of the process.

9. In a steam generator having a heating zone equipped with a fuel burner, a duct extending through said zone and means for continuously forcing a stream of liquid through the duct to transform the liquid into steam and deliver it to the steam discharge, a governing system comprising pressure sensitive means associated with said duct near the entrance thereof into said heating zone and adapted to detect variations of pressure caused by variations of the ratio between the quantity of liquid flowing in said duct and the quantity of heat generated in said zone, a governing device associated with said fuel burner and adapted to govern the heat supplied thereby, and means connecting said pressure sensitive means with said governing device and adapted to partially control the latter in dependence on said variations of pressure in the sense of causing said element to increase the heat supplied as said pressure drops and to reduce the heat supplied as said pressure increases, and a flowmeter adapted to measure the quantity of liquid flowing through the duct, the flowmeter being connected to said governing device to partially control it in the sense of compensating for any control response caused by variation in said pressure caused by increase or reduction of the water feed.

10. In a steam generator having a heating zone equipped with a fuel burner, a duct extending through said zone and means for continuously forcing a stream of liquid through the duct to transform the liquid into steam and deliver it to the steam discharge, a governing system comprising pressure sensitive means associated with said duct near the entrance thereof into said heating zone and adapted to detect variations of pressure caused by variations of the ratio between the quantity of liquid flowing in said duct and the quantity of heat generated in said zone, a governing device associated with said fuel burner and adapted to govern the heat supplied thereby, and means connecting said pressure sensitive means with said governing device and adapted to partially control the latter in dependence on said variations of pressure in the sense of causing said element to increase the heat supplied as said pressure drops and to reduce the heat supplied as said pressure increases, and a flowmeter adapted to measure the quantity of liquid flowing through the duct, the flowmeter being connected to said governing device to partially control it in the sense of compensating for any control response caused by variation in said pressure caused by increase or reduction of the water feed, and a temperature sensitive element in the downstream section of the duct connected for partial control of the governing device in the sense of increasing the heat supplying capacity of the burner when the temperature drops and decreasing it when the temperature rises.

11. In a steam generator having a heating zone equipped with a fuel burner, a duct extending through said zone and means for continuously forcing a stream of liquid through the duct to transform the liquid into steam and deliver it to the steam discharge, a governing system comprising pressure sensitive means associated with said duct near the entrance thereof into said heating zone and adapted to detect variations of pressure caused by variations of the ratio between the quantity of liquid flowing in said duct and the quantity of heat generated in said zone, a governing device associated with said fuel burner and adapted to govern the heat supplied thereby, and means connecting said pressure sensitive means with said governing device and adapted to partially control the latter in dependence on said variations of pressure in the sense of causing said element to increase the heat supplied as said pressure drops and to reduce the heat supplied as said pressure increases, and a flowmeter adapted to measure the quantity of liquid flowing through the duct, the flowmeter being connected to said governing device to partially control it in the sense of compensating for any control response caused by variation in said pressure caused by increase or reduction of the water feed, said governing device including a voltage balancing bridge network including two variable resistances, one being controlled by the pressure sensitive means and the other by flowmeter.

12. In a steam generator having a heating zone equipped with a fuel burner, a duct extending through said zone and means for continuously forcing a stream of liquid through the duct to transform the liquid into steam and deliver it to the steam discharge, a governing system comprising pressure sensitive means associated with said duct near the entrance thereof into said heating zone and adapted to detect variations of pressure caused by variations of the ratio between the quantity of liquid flowing in said duct and the quantity of heat generated in said zone, a governing device associated with said fuel burner and adapted to govern the heat supplied thereby, and means connecting said pressure sensitive means with said governing device and adapted to partially control the latter in dependence on said variations of pressure in the sense of causing said element to increase the heat supplied as said pressure drops and to reduce the heat supplied as said pressure increases, and a flowmeter adapted to measure the quantity of liquid flowing through the duct, the flowmeter being connected to said governing device to partially control it in the sense of compensating for any control response caused by variation in said pressure caused by increase or reduction of the water feed, and a temperature sensitive element in the downstream section of the duct connected for partial control of the governing device in the sense of increasing the heat supplying capacity of the burner when the temperature drops and decreasing it when the temperature rises, said governing device including a voltage balancing bridge network and a relay operated thereby, the relay being in control of the heat supplying capacity of the burner, the network including three variable resistances, the variation of each being respectively controlled by the pressure sensitive means, the flowmeter, and the temperature sensitive element.

13. The apparatus described in claim 9 in which the pressure sensitive means comprises a device providing a liquid by-pass communicating between the steam discharge and water feed intake to said heating zone, the device having means serving to measure the rate of flow of liquid through the by-pass.

14. The apparatus described in claim 10 in which the pressure sensitive means comprises a device providing a liquid by-pass communicating between the steam discharge and water feed intake to said heating zone, the device having means serving to measure the rate of flow of liquid through the by-pass.

15. The apparatus described in claim 9 in which the pressure sensitive means is a flexed diaphragm pressure gage.

16. The process defined in claim 1 in which the pressure determined is the pressure differential existing between the intake region of the heating zone and the steam discharge region of the process.

References Cited in the file of this patent

UNITED STATES PATENTS

| | | |
|---|---|---|
| 2,217,637 | Junkins | Oct. 8, 1940 |
| 2,422,178 | Blizard | June 17, 1947 |

UNITED STATES PATENT OFFICE

CERTIFICATE OF CORRECTION

Patent No. 2,811,311                               October 29, 1957

Bernd Zuppke

It is hereby certified that error appears in the above numbered patent requiring correction and that the said Letters Patent should read as corrected below.

In the heading to the printed specification, between lines 5 and 6, insert -- Claims priority, application Germany September 30, 1954 --.

Signed and sealed this 31st day of December 1957.

(SEAL)
Attest:
KARL H. AXLINE
Attesting Officer

ROBERT C. WATSON
Commissioner of Patents